United States Patent [19]
Noble et al.

[11] Patent Number: 5,411,006
[45] Date of Patent: May 2, 1995

[54] ENGINE IGNITION AND CONTROL SYSTEM

[75] Inventors: Gardiner A. Noble, Farmington; Leonard Kafka, Ann Arbor; Mark Ciuffetelli, Clarkston, all of Mich.

[73] Assignee: Chrysler Corporation, Highland Park, Mich.

[21] Appl. No.: 148,381

[22] Filed: Nov. 8, 1993

[51] Int. Cl.$^6$ .......................................... F02P 11/00
[52] U.S. Cl. .................................................. 123/634
[58] Field of Search ............... 123/634, 425, 636, 638, 123/625, 644, 647; 73/35, 115; 324/522, 523, 536

[56] References Cited

U.S. PATENT DOCUMENTS

| | | | |
|---|---|---|---|
| 3,035,224 | 5/1962 | Whaley et al. | 324/536 |
| 3,274,487 | 9/1966 | Johnston | 324/523 |
| 4,090,125 | 5/1978 | Warner | 324/522 |
| 4,751,430 | 6/1988 | Muller et al. | 315/57 |
| 4,846,129 | 7/1989 | Noble | 123/425 |
| 4,903,674 | 2/1990 | Bassett et al. | 123/634 |
| 5,101,803 | 4/1992 | Nakamura et al. | 123/634 |
| 5,111,790 | 5/1992 | Grandy | 123/425 |
| 5,144,935 | 9/1992 | Taruya et al. | 123/633 |
| 5,146,906 | 9/1992 | Agatsuma | 123/634 |
| 5,170,767 | 12/1992 | Wada et al. | 123/633 |

Primary Examiner—Raymond A. Nelli
Attorney, Agent, or Firm—Mark P. Calcaterra

[57] ABSTRACT

An engine ignition and control system for an internal combustion engine. The system includes an ignition transformer mounted directly to a spark plug and adapted to rapidly refire the spark plug during a combustion cycle enabling the performance of various ignition diagnostic procedures. A controller provides signals to a circuit which causes charging of the transformer for ignition and subsequent charging of the transformer for diagnostic purposes. The system also includes a diagnostic circuit, connected to the transformer, which can detect the occurrence of electrical discharges across the spark plug electrodes as a result of the diagnostic charges. The detection circuit either outputs a signal or omits a signal to the controller which allows the controller to diagnose conditions within the combustion cylinder. Additionally, the diagnostic circuit is capable of outputting a signal which can be correlated to the load on the engine.

27 Claims, 8 Drawing Sheets

ENGINE IGNITION AND CONTROL SYSTEM

FIELD OF THE INVENTION

The present invention generally relates to a automotive ignition system for an internal combustion engine. More particularly, this invention relates to a coil-on-plug ignition transformer which is capable of being fired according to an algorithm to perform various engine diagnostic procedures. The spark plug mounted ignition system of the present invention therefore operates as a feedback element of the engine control system.

BACKGROUND AND SUMMARY OF THE INVENTION

In order to initiate combustion of an air/fuel mixture within an internal combustion engine, a spark ignition system generates a high voltage arc across the spark plug electrodes at the appropriate time in the engine operating cycle. The onset of the arc across the spark plug gap is timed to occur at a predetermined number of degrees of crankshaft rotation, usually before the piston has reached top dead center (TDC).

If the spark timing is properly set, the combustion process initiated by the spark plug action will cause a pressure increase to develop within the combustion chamber that will peak just shortly after TDC during the piston's power stroke. If the spark is initiated too late in the operating cycle (retarded timing), the pressure developed within the combustion chamber will not be efficiently converted by the engine into work. On the other hand, if the spark is initiated too early in the operating cycle (advanced timing), extremely high and potentially damaging pressures and temperatures may result. The pressure and temperature increases associated with advance timing are also not efficiently converted by the engine into a useful work output.

Excessive advanced timing can also lead to the occurrence of several other types of combustion chamber phenomena. One such phenomena is auto-ignition of the end gases and another is pre-ignition.

Auto-ignition is a condition where the end gases (the unburnt portion of the fuel-air mixture initially ignited by the movement of the flame front) explode spontaneously as a result of the cylinder temperature and pressure becoming too high for the type of fuel being burned in the engine. In response to the sudden release of energy, the cylinder temperature dramatically increases and the cylinder pressure fluctuates, alternately rising and falling, as a pressure wave travels back and forth across the combustion chamber. When caused by auto-ignition of the end gases, the rapid pressure and temperature fluctuations are seen to occur after TDC. If the rate at which energy is released through auto-ignition is high enough, the exploding gases will cause the cylinder walls to vibrate resulting in audible engine noises, including the distinctive sound known as "pinging".

Many engine developers believe that a mild degree of auto-ignition is desirable because it generates turbulence within the combustion chamber, which hastens the combustion process, at a critical time when the normal flame kernal is in the process of being quenched. Slight auto-ignition has also been found to reduce the amount of unburnt hydrocarbons remaining after the completion of the spark-triggered ignition process. By utilizing the energy released when the hydrocarbons are burned during mild auto-ignition, it follows that lower hydrocarbon emissions and improved fuel economy can be realized.

Because of the benefits stated above, among others, engine designers often seek to calibrate ignition systems so that the spark advance is close to the threshold of auto-ignition. However, excessive auto-ignition must be avoided since it leads to higher combustion chamber temperatures and is counter productive. In fact, these elevated temperatures can heat the spark plug electrodes to the point where they will initiate the combustion process independently of the occurrence of a spark. This phenomena is pre-ignition.

Pre-ignition, which can cause significant engine damage including perforation of the piston, is characterized by the occurrence of extremely high cylinder temperatures and pressures near TDC. The audible sound associated with pre-ignition is produced by the action of auto-ignition and, when extreme, referred to as "knock". Generally, it can be stated that auto-ignition leads to pre-ignition and, subsequently, that pre-ignition leads to further auto-ignition.

A number of factors influence the spark timing threshold which generates auto-ignition. Some of these factors include, inlet air temperature, engine speed, engine load, air/fuel ratio and fuel characteristics. Because accurate control of the spark timing is a significant contributor to engine performance, numerous types of engine control systems have been developed. These control systems typically employ a microprocessor based closed-loop spark timing control system which simultaneously measures a number of parameters, such as exhaust composition, coolant temperature, and the occurrence of spark knock via transducers. The resulting data is then processed to set the engine timing near a predicted auto-ignition threshold.

The knock detectors typically used in engine control systems are piezoelectric transducers which sense the intense vibration caused by spark knock. When used in the environment of an internal combustion engine, however, these transducers may not be selective enough to distinguish the slight vibration produced by incipient auto-ignition over the normal amount of engine vibration. For this reason, these detectors are typically not capable of sensing, particularly at high engine speeds, the threshold of auto-ignition. An engine control system is therefore needed which is capable of detecting incipient auto-ignition and which enables more precision in setting the spark timing in a closed-loop system.

Other characteristics found in ignition systems and considered to be undesirable include, but are not limited to: excessive spark plug electrode wear; the inability to fire fouled spark plugs; poor cold weather starting; poor exhaust emissions during cold engine starting and running; the remote generation of high voltages in the engine compartment by the ignition system; the routing and distribution of high voltages over considerable lengths of ignition wire; and the generation of significant amounts of electro-magnetic radiation within and around the ignition system, as well as the vehicle, during operation of the engine.

It is therefore an object of the present invention to provide an engine control and ignition system which overcomes the limitations and disadvantages of known systems.

It is also an object of this invention to provide an ignition system which is capable of performing various engine diagnostic procedures so as to operate as a feedback element of the engine control system. In particular, the invention operates as a non-invasive combustion chamber monitor through the utilization of the ignition transformer and the spark plug as the feedback elements.

The present invention has as further objects the providing of a method for determining engine load, a method for detecting engine misfire and a method for detecting auto-ignition of the end gases.

Another object of the invention is to provide a coil-on-plug ignition transformer which is capable of charging, firing and retiring the spark plug at short, repeatable intervals as programmed into the engine control system.

One feature of this invention is that it eliminates the various problems associated with the distribution of high voltages throughout the ignition system. Another feature of the present invention is that it reduces the amount of electro-magnetic radiation generated by the ignition system around the engine and the vehicle itself.

Reduced spark plug electrode wear is another feature as well as the ability to fire badly fouled spark plugs.

A still further feature of the invention is enhanced cold weather starting capabilities of an internal combustion engine and the minimization of exhaust emissions which occur during cold starting and running. A related feature is the extension of the air/fuel ratio toward the lean limit which helps to further reduce emissions and improve fuel economy during normal engine operation.

SUMMARY OF THE INVENTION

Recent research, some of which has been performed by the assignee of the present invention, has indicated that combustion within an internal combustion engine can be improved by initiating the burning process with a spark of the type known as a breakdown discharge. The breakdown spark has characteristics quite different from those generated by conventional automotive ignition systems and responds differently to different conditions within the combustion chamber. This realization has led to the development of the present invention, an ignition control system having components which are capable of exploiting the characteristics of the breakdown spark so as to enable the performance of various engine diagnostic procedures using the spark plug itself as a feedback element of the engine control system.

The ignition process has been characterized as consisting of three distinct phases; the breakdown phase, the arc phase and the glow phase. The initial phase, the breakdown phase, is characterized by high current (typically 50-200 amperes (A)) which results from the energy stored in the spark plug capacitance (typically 10-15 picofarad (pF)) discharging through the arc. The breakdown phase typically lasts less about a nanosecond (ns). The second phase, then arc phase, occurs when the arc current is between 0.1 and 1.0 A and the arc voltage is about 180 volts ($v$). The discharge current remains in the arc phase for approximately 100 $\mu$s. The glow phase occurs when the arc current drops below 0.1 milliamperes (mA) and the voltage across the spark plug electrodes goes to 500$v$.

These three phases, the breakdown, arc and glow phases, have been found to reliably initiate combustion of the air/fuel mixture when the air/fuel ratio is respectively twenty-one to one, eighteen to one and sixteen to one. If the breakdown phase is exploited, it follows that the lean limit can be extended and numerous benefits realized.

As mentioned above, the present invention details an ignition and engine control system which is not only capable of firing the spark plug, but which is also capable of performing diagnostic functions. Specifically, one aspect of the present invention details the ignition and engine control system itself. Another aspect details the methods for performing various diagnostic procedures. A further aspect of this invention is a low impedance ignition transformer, mounted directly on the spark plug, which enables both of the above. The transformer's low impedance augments the capabilities of the engine control system's microprocessor unit (MPU) making it possible for the MPU to use the spark plug to monitor a number of engine conditions including misfire, auto-ignition and engine load.

The ignition and engine control system of the present invention includes six principal components not counting the engine itself. These are an engine controller (which has inputs that monitors various engine parameters), a MPU (which is programmed to carry out various routines based on the inputs to the engine controller), ignition or coil driver circuit, an ignition transformer, a spark plug and current discharge detection circuitry, all of which are described in greater detail below.

The design of the ignition transformer provides for a short charging time and an intense secondary current of short duration (approximately 0.5-1 A, decaying to zero in approximately 100 $\mu$s) that reliably initiates stable combustion. This is achieved while deriving energy directly from the vehicle's 12$v$ power supply and eliminating the need for an expensive 12$v$ DC to 250$v$ DC converter.

Because of the intensity and duration spark, as well as the short charging time of the transformer, the present transformer configuration enables the elimination of the ignition system's high voltage distribution system and also makes possible the rapid, multi-firing of individual spark plugs by the engine control system. Previously, multi-firing ignition systems have had to rely on a fixed countdown counter or a natural resonance within the ignition circuitry to retrigger the firing. In a standard ignition system, the charging time for the primary, and therefore the time necessary for re-firing of the spark plug, is about 3000 $\mu$s. Relatively slow in terms of the duration of the engine operating cycle. The present invention, however, is designed to multi-fire based on algorithms programmed into the engine control system itself and has the capability of retiring the spark plugs at 200 $\mu$s intervals.

Under hard to ignite conditions, it has been found that the multi-firing of the spark plug during the combustion event is beneficial to the combustion process. According to the present invention, multi-firing is programmed to occur only under hard-to-ignite mixture conditions such as throttle tip-ins, cold starts, idle and at combinations of light loads and low rpms. By not multi-firing under other conditions, an extension in the life of the ignition components is realized, particularly in the spark plug electrodes.

Since spark plug electrode wear is directly proportional to the time over which the arc current flows, electrode wear can be reduced by applying a higher intensity current over a shorter duration. As mentioned above, when current flowing between the spark plug electrodes is above 100 mA, the voltage is about 180$v$.

Below 100 mA, however, the voltage rises to about 500$v$. When accelerated by a 500$v$ differential, the electrons and charged particles being exchanged between the spark plug electrodes penetrate the electrode surfaces more vigorously than when accelerated by a 180$v$ differential.

In a standard flyback ignition coil system, the electrons and charged particles are driven for well over 1,500 $\mu$s at the 500$v$ differential. This results in significant electrode wear. In the low impedance system of the present invention, the peak voltage across the spark plug electrodes is intense, about 22 kilovolts (k$v$), but it is reached approximately 4 $\mu$s after the 14 transformer primary has been switched off and the overall time spent above the 500$v$ differential is typically less than 20 $\mu$s. While the increased intensity of the spark better ensures stable combustion, its significantly shorter duration minimizes spark plug electrode wear. This is beneficial since it makes it possible to reduce the diameter of the spark plug electrodes themselves. It is well known that spark plug electrodes having a smaller size and mass will minimize quenching of the initial kernel of burning gases and produce more stable combustion.

The intensity and short duration of the spark plug arc current is advantageous and beneficial in several other regards. These benefits include, but are not limited to: more stable combustion; reduced energy consumption by the ignition process; lower overall exhaust emissions; extending operation of the engine further toward the lean limit; extended catalytic converter life; a reduction in arc current time and spark plug electrode wear; the increased ability to fire fouled spark plugs; enhanced cold weather starting and running capabilities; a reduction of cold start exhaust emissions; an elimination of high voltage routing about the engine; and a reduction in electromagnetic radiation generation in and around the vehicle.

As mentioned above, the system of the present invention can be used to detect the misfiring of a cylinder in the engine. After the fully charged ignition transformer has been switched off generating a maximum secondary voltage across the spark plug electrodes and starting the combustion process, while the crankshaft and the combustion cycle are still near TDC, the MPU causes the ignition transformer to develop a predetermined applied voltage at the spark plug gap. If combustion has already been initiated, the combination of temperature and pressure in the area of the spark plug will enable the applied voltage to conduct across the electrodes. If the cylinder has misfired, the predetermined level of applied voltage at the spark plug gap will not be high enough to cause the spark plug electrodes to conduct. As a result of the applied voltage not being spent in a secondary current discharge, a negative voltage excursion is reflected back into the primary. The electronic switch of the primary winding is monitored by the detection circuitry and the engine control system and, if this negative voltage excursion is detected, the system records that misfire has occurred. If the misfire repeats for a successive combustion cycles, the MPU and engine controller can be programmed to shut the cylinder down preventing unburnt hydrocarbons from being released in the exhaust emissions and reducing fuel consumption. In an attempt to curb exhaust emissions, various states are enacting laws that require that a misfiring cylinder be shut down. One such law goes into effect in California in 1996.

The present invention can also be used to detect auto-ignition of the end gases and set the engine timing at the threshold of auto-ignition. In using the spark plug to detect whether auto-ignition of the end gases is occurring, the MPU causes the ignition transformer to rapidly duty cycle at a predetermined voltage. This is done at a point in the combustion cycle where knock is expected to occur (typically after top-dead-center (ATDC)). The duty-cycle period is calculated from an algorithm stored in the MPU of the engine controller and is a function of various engine parameters including engine load, engine speed, and charge temperature.

If normal combustion conditions are occurring in the cylinder at the time of duty cycling, the current resulting from the duty cycling will not be transferred across the plug gap, but will instead be reflected back through the primary as a negative voltage excursion. The negative excursion can again be detected at the high side of the electronic switch by the detection circuitry and the engine controller. If auto-ignition is occurring, the resulting temperature and pressure waves present within the cylinder will correspond with one or more of the applied duty cycle voltage potentials enabling it to conduct across the electrode gap. As a result, not all of applied voltages will have a corresponding reflected negative voltage excursion. By monitoring the primary for a missing negative voltage excursion, auto-ignition of the end gases can be recognized and detected by the engine controller. Using this information regarding the occurrence or non-occurrence of auto-ignition, the engine controller can progressively step the ignition timing so that threshold of auto-ignition is maintained.

Additionally, the uniqueness of the present ignition transformer facilitates the measurement of the spark plug breakdown voltage during the combustion cycle. It is the magnitude of this parameter (which reflects the relationship between the combustion pressure, temperature and fuel concentration) that provides a non-intrusive indication of the engine's performance or load. By enabling monitoring of the engine load, the ignition and engine control system of the present invention eliminates the need for expensive manifold absolute pressure (MAP) sensors. Knowing that the cylinder pressure is proportional to the engine load, the spark plug breakdown voltage can be directly correlated to the engine load in view of Paschen's Law. At an "interrogate" time or crank angle position ATDC, where other variables such as spark advance and the air/fuel ratio are no longer an influence on the cylinder pressure, the breakdown voltage is determined by firing the spark plug and measuring the time over which the transformer inductive current discharge. In view of the transformer's known characteristics, the discharge time is then correlated by the engine controller into breakdown voltage to determine the cylinder pressure and, ultimately, the engine load.

All of the above is made possible by the short charging and discharging time of the ignition transformer, the ignition and detection circuitry and the control software programmed into the MPU and engine controller. In the time it takes a conventional ignition transformer performs a single charge and discharge, the ignition transformer of the present invention is capable of initiating combustion, recharging and retiring a multiple number of times to perform the diagnostic procedures.

Intended to operate within the spark plug well of the engine, the flyback transformer of the present invention incorporates a torodial design that eliminates the flow of magnetic flux inside the cylinder defining the spark plug well. This makes the present ignition transformer largely insensitive to eddy current loading and is a major reason for the decreased production of electromagnetic radiation.

Having a restricted diameter, the ignition transformer itself includes a cylindrical core whose length can be varied to provide the necessary cross sectional area in the transformer core. The core is positioned within a dielectric bobbin and the primary and secondary of the transformer are wound around both the bobbin and the core. The wound core and bobbin is then positioned within a housing whose lower end is configured to receive the high side terminal of a spark plug. The spark plug itself can be of a standard design or can be modified to reflect the ability to use smaller electrodes with the present invention.

The electronics of the ignition and engine control system are controlled by engine controller which monitors input signals from the cam and crank speed sensors, as well as the vehicle ignition signal. These inputs allow the engine controller and the MPU to calculate engine speed and position. As a result of these calculations, the MPU calculates and sends output signals at the proper time, based on its programmed algorithm, to coil driver circuits which charge and trigger the ignition transformer. The MPU utilizes the detection circuitry to monitor the combustion cylinder and determine the engine load and/or whether a knock or misfire condition exists. Depending on the existing conditions, the MPU signals and alerts other circuits or modules of the engine to take the appropriate measures.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENT

Figure 1:
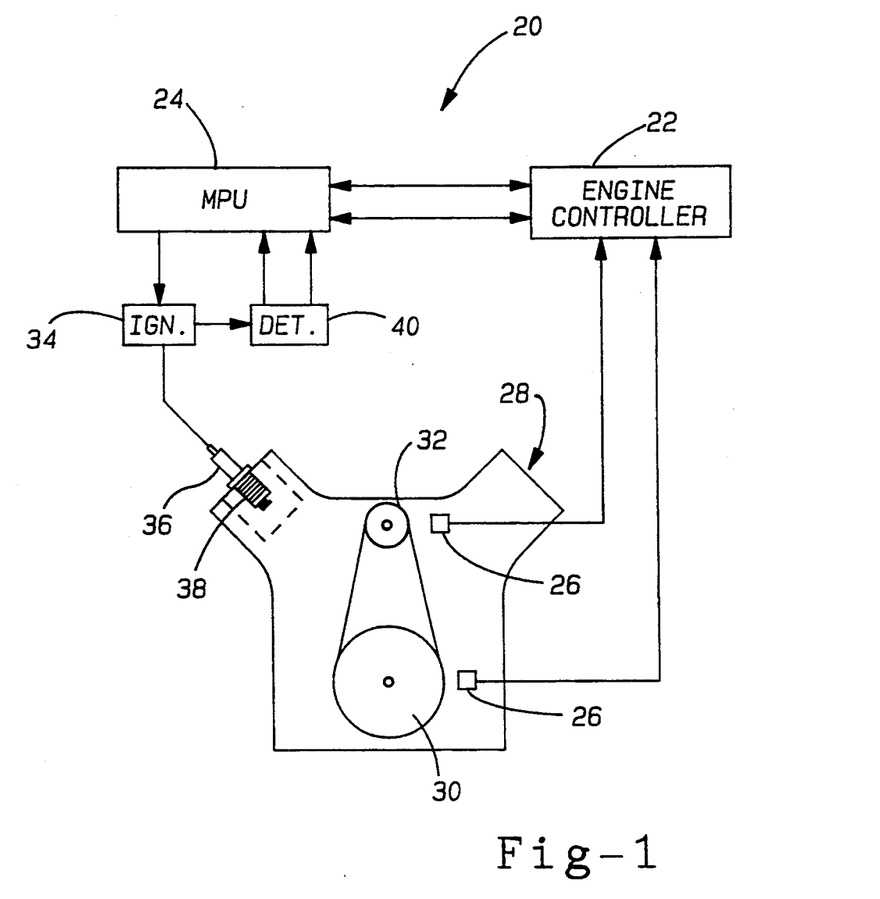
FIG. 1 is a schematic illustration showing the general components of an ignition and engine control system embodying the principles of the present invention.

Referring now to the drawings, an ignition and engine control system embodying the principles of the present invention is generally illustrated in FIG. 1 and designated at 20. The system includes an engine controller 22 and an MPU 24 which spends most of its time executing a main program loop that performs various engine functions which are relatively non-critical from an engine timing standpoint. The rate at which these functions must be repeated is also relatively slow in comparison to the engine cycle itself. This generally means that these "non-critical" functions can be performed asynchronously from the engine combustion events.

Fuel injection and ignition events, however, must be precisely synchronized to the engine cycle. To accomplish this, the engine controller 22 and MPU 24 are programmed to service interrupts that are triggered by timing pickups or speed sensors 26 mounted on the engine 28 relative to a flywheel 30 on the crankshaft and/or a pulley 32 on the camshaft. The interrupts produced by the timing pickups 26 load a timing element of the MPU 24 which creates real time control signals for the fuel injectors and ignition coil drivers at the correct instant and for the correct duration during the combustion cycle. The engine controller 22 is also be coupled to various other engine parameters including the vehicle ignition signal.

Using the results of the above calculations, the MPU 24 outputs signals at the proper time through an ignition or coil driver circuit 34 causing an ignition coil or transformer 36 to begin charging directly from the vehicle's 12v power supply. The ignition transformer 36, which is mounted directly onto a spark plug 38 and is known as a coil-on-plug transformer 36, is charged until its core becomes saturated. At the appropriate number of engine degrees before top dead center (BTDC), the MPU 24 then causes a high speed switching transistor of the coil driver circuit 34 to open, shutting off the current in the transformer primary. If conditions are right within the engine cylinder, the secondary capacitance of the transformer 36 will discharge in a high voltage current across the spark plug 38 gap and initiate combustion. After the ignition transformer has been scheduled to fire, the MPU 24 runs through a series of programmed algorithms designed to cause multi-firing of the spark plug or perform various engine diagnostic procedures. If diagnostic procedures are being performed, the MPU 24 utilizes the detection circuitry 40 as further outlined below.

The ignition transformer 36 of the present invention is a very low impedance device which, by design, is capable of generating a significant secondary voltage (about 25kv) which peaks in approximately 2–4 μs and decays to zero in approximately 100 μs. Since the transformer 36 will fully charge and saturate its core in about 100 μs from the vehicles 12v power supply, this means the transformer 36 is capable of being retired at 200 μs intervals.

Previously, to create signals for repetitively operating the coil driver circuit 34 or for multi-firing an ignition transformer and spark plug at 200 μs intervals, numerous timing interrupts would have had to been serviced by the engine controller 22 and MPU 24 for each refiring of the spark plug. This, however, would result in excessive interrupt loading of the MPU 24 and would create a significant number of timing conflicts. With excessive interrupts being present, the main program the MPU 24 would be disrupted at a high frequency during a large percentage of its execution time resulting in interrupts being nested within one another. The multiple timing conflicts would require the MPU 24 to service more than one interrupt at a time in order to generate the required control signals. The MPU 24, however, can only execute one interrupt at a time.

In the present invention, the MPU 24 is directed by the engine controller 22 to send signals to the coil driver circuit 34 according to a specific algorithm programmed into the MPU 24. Thus, the need for servicing a multitude of interrupts is eliminated because of the short time necessary to re-fire the transformer 36.

The ignition and engine control system 20 of the present invention utilizes a specially designed spark plug mounted ignition coil or transformer 36 as a feedback element in the engine control system 20. In addition to its feedback functions, the ignition transformer 36 provides an intense, short duration (less than 100 μs) secondary current that reliably initiates combustion, even when the spark plug is badly fouled, and promotes spark plug longevity.

The uniqueness of the ignition transformer 36 provides for a non-intrusive indication of engine performance by facilitating the measurement of the spark plug breakdown voltage, a parameter whose magnitude reflects the relationship between the combustion pressure, temperature, and fuel concentration. In general, the relationship between the pressure, temperature and electrode gap is defined by Paschen's Law which states:

$$V_{BD} = K_1 * \frac{Pd}{T} + K_2 * \sqrt{\frac{Pd}{T}}$$

where P is the pressure; d is the electrode spacing; T is the temperature; and $K_1$ and $K_2$ are constants.

The voltage level that is generated by the ignition transformer 36 is directly related to the magnitude of the primary winding current, which is a function of charging time, at the time the ignition transformer is switched. In the present invention, the primary current that generates the maximum secondary voltage is typically reached in a charge time of 100 μs when the voltage applied to the primary winding is 12v. A charge time of less than 100 μs will therefore result in a secondary voltage that is less than the maximum. In other words, the shorter the charge time, the lower the secondary voltage of the ignition transformer 36.

Figure 2:
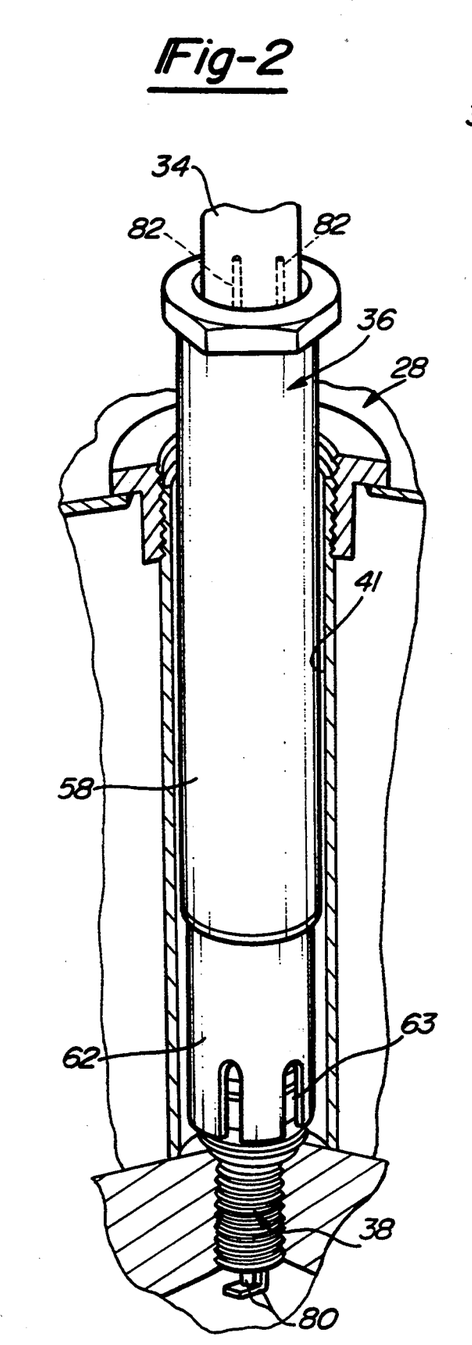
FIG. 2 is a perspective view with portions broken away showing the ignition transformer of the present invention positioned on the spark plug of an internal combustion engine.
Figure 3:
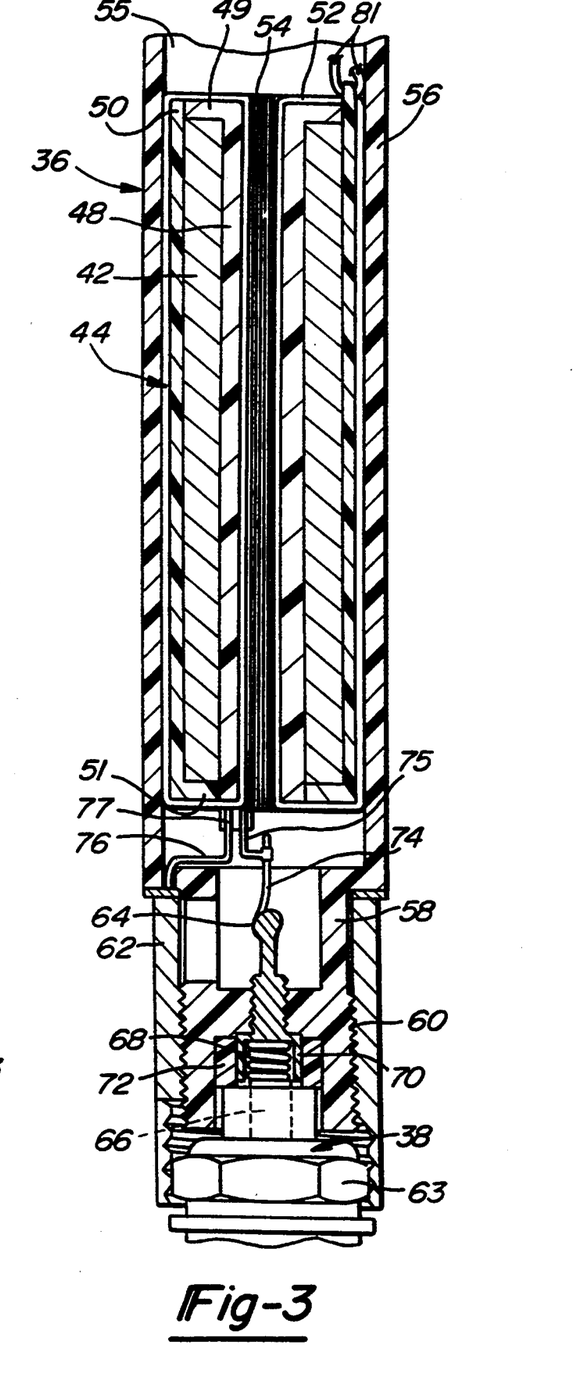
FIG. 3 is a longitudinal sectional view of a portion of an ignition transformer embodying the principles of the present invention.

Referring now to FIGS. 2 and 3, the spark plug mounted or coil-on-plug ignition transformer 36 of the present invention is generally illustrated therein. The physical dimensions of the ignition transformer 36 are dictated by the design of the engine 28 itself. To enable mounting directly on the spark plug 34 itself, the ignition transformer 36 must be able to fit within the diameter of a spark plug well 41 of the engine 28. While this specific design criteria differs from one engine version to the next, the principles of the present invention will be applicable to the entire range of spark plug well diameters. The length limit of the ignition transform is determined by the clearance between the engine 28 and the hood of the vehicle (not shown). The length of the ignition transformer 36 can therefore be adjusted to accommodate the required cross sectional area of its core, as determined by the various other transformer parameters.

The ignition transformer 36 of the present invention includes a magnetic core 42 which is received in a dielectric bobbin 44. Perhaps best seen in FIGS. 4–6, the core 42 is substantially cylindrical and includes portions which define an air gap 46 that extends the length of the core 42. In order to provide a very efficient transformer 36, the retentivity of the core is required to be a very small percentage of its maximum flux density. When the magnetizing force (expressed in ampere turns) is removed from the core 42 of the transformer 36 by switching off the primary current, the residual magnetic flux in the core 42 rapidly decreases. The voltage generated in the secondary winding of the transformer 36 by the collapse of the primary current is directly proportional to the number of turns in the secondary and the magnitude of the change in the core flux and is inversely proportional to the time rate of change in the core flux. Mathematically stated:

$$e_{sec} = -L \frac{d\theta}{dt}$$

where $e_{sec}$ is the secondary voltage, L is the inductance of the secondary winding, $$\frac{d\theta}{Dt}$$

is the time rate of change in the core flux, and the negative sign (−) indicates that the core flux is decreasing.

To comply with the mathematical performance requirements, the manufacturing tolerances of the core 42 must be such that the cross sectional area of the core 42 is substantially constant. While the limit on the overall length of the transformer 36 and the length of the transformer core 42 is determined by the clearance between the engine 28 and the hood of the vehicle, the dimensional limit on the core's inside diameter is determined by the access requirements of the machine which winds the wire of the primary and secondary windings onto the core 42. The physical limits on the outside diameter of the core 42 are determined by, not only the diameter of the spark plug well 41, but also the dielectric strength of the material from which the bobbin 44 is made.

The bobbin 44 which receives the core 42 includes an inner cylindrical sleeve 48 and an outer cylindrical sleeve 50. Each of the sleeves 48 and 50 further include a radial flange at one end which extends over the ends of the core 42 to encase it within the bobbin 44. In the illustrated embodiment, the inner sleeve 48 is provided with an outwardly directed radial flange 49 at its distal end, while the outer sleeve 50 is provided with an inwardly directed radial flange 51 at its proximal end. The outer diameter of the inner sleeve 48 and the inner diameter of the outer sleeve 50 are dimensioned so that the core 42 is in surface-to-surface contact with the inner and outer sleeves 48 and 50. Preferably, the bobbin 44 is made of a material having a high dielectric strength, such as one of the well known plastics.

Figure 4:
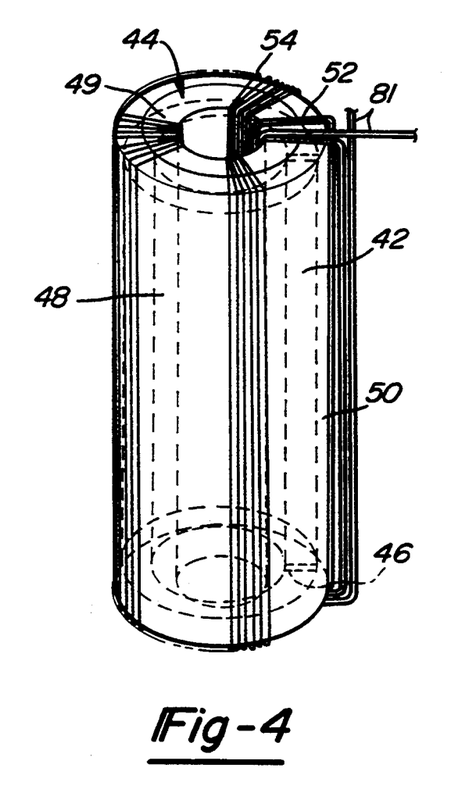
FIG. 4 is a perspective view of the core, bobbin, primary and secondary windings as provided by the present invention.
Figure 5:
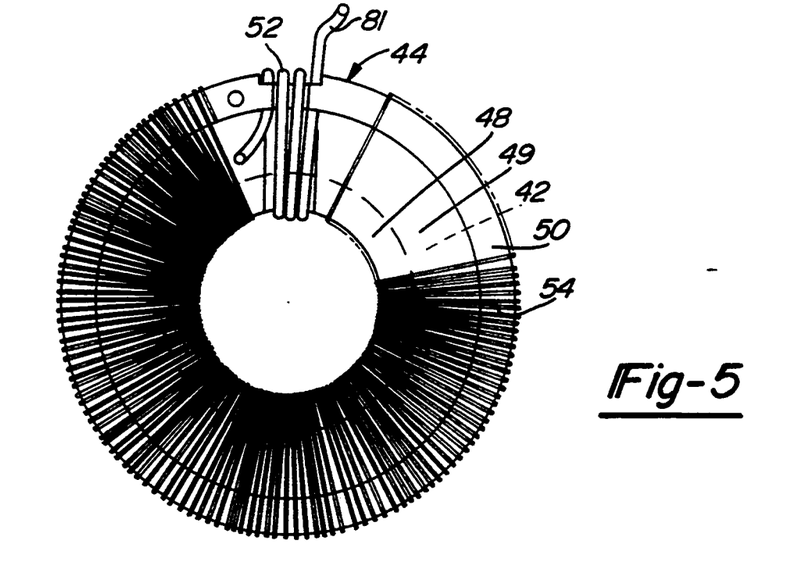
FIG. 5 is a top plan view of the core, bobbin, primary and secondary windings as seen in FIG. 4.
Figure 6:
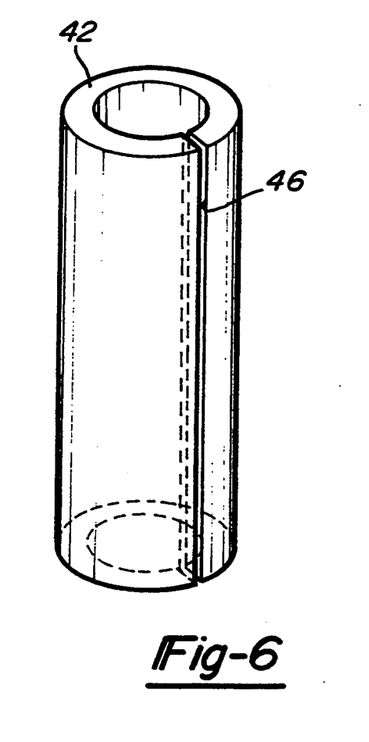
FIG. 6 is a perspective view of the transformer core.

Referring now to FIGS. 3–5, the primary and secondary windings 52 and 54 of the present ignition transformer 36 can be seen. The windings 52 and 54 are wound longitudinally about the core 42 and bobbin 44 so as to extend along the interior surface defined by the inner sleeve of the bobbin 44, over one of the longitudinal ends of the bobbin 44, along the exterior surface defined by the outer sleeve 50 and across the opposing longitudinal end. Facilitating the efficiency of the transformer 36, the primary winding 52 consists of a lesser number of turns of larger diameter wire than the secondary winding 54 and is located on the bobbin 42 immediately over the air gap 46 defined in the core 42. The secondary winding 54 of smaller diameter wire substantially covers the remainder of the core 42 and bobbin 44. The combination of the windings 52 and 54 provides the core 42 and bobbin 44 with a generally torodial shape that is best seen in FIG. 4.

After the windings 52 and 54 are positioned over the bobbin 44 and the core 42, the wound assembly is positioned within a cavity 55 defined within a cylindrical, insulative housing 56. The inboard or proximal end of the housing 56, generally designated at 58, is provided with threads 60 engage a similarly threaded adapter 62. The adapter 62 is constructed from a conductive metal and is configured to allow the ignition transformer 36 to engage the mounting nut 63 of the spark plug 38.

The proximal end 58 of the housing 56 has mounted therein, in a threaded engagement, an ignition terminal 64 which is adapted to electrically engage the high side terminal 66 of the spark plug 38. To ensure engagement between the ignition terminal 64 of the transformer 36 and the high side terminal 66 of the spark plug 38, the ignition terminal 64 may be provided with a biased contact element or spring 68 that positively engages the high side terminal 66 and is secured by soldering or other bonding techniques within a seat 70 of the ignition terminal 64. The biasing of the contact element 68 not only ensures that electrical contact will be made with the spark plug terminal 66, but also provides the transformer 36 with a range over which it is capable of engaging the spark plug 38.

The transformer 36 is also provided with an annular seal 72 of rubber or other suitable material in the housing 56 and is positioned around the high side terminal 66 and contact element 68. The seal 72 prevents moisture and dirt from entering between the spark plug 38 and the ignition transformer 36 and fouling the electrical contact therebetween.

The ignition terminal 64 of the transformer 36 is connected by a lead 74 to the high side 75 of the secondary winding 64. The low side 77 of the secondary winding 64 is connected by a second lead 76 to the adapter 62 which electrically engages the mounting nut 63 and grounds the spark plug 38. The primary winding 52 has its ends 81 connected to terminals 82, on the distal end of the transformer 36, which couple the transformer 36 to the ignition circuitry 34 and the remainder of the engine control and diagnostic system 20.

Substantially filling the remainder of the cavity 55 defined by the housing 56 is a suitable dielectrical material. While numerous other considerations may dictate the specific nature of the dielectric filling material, it is believed that various types of materials could be utilized with satisfactory results. For example, the dielectric filling material may be a preformed solid material fitted within the housing. Another would include a setable dielectric material poured into the housing and allowed to subsequently harden. Still another variety would include a liquid dielectric material poured into and sealed within the housing. Additionally, it is believed that combinations of the above could be used.

Figure 7:
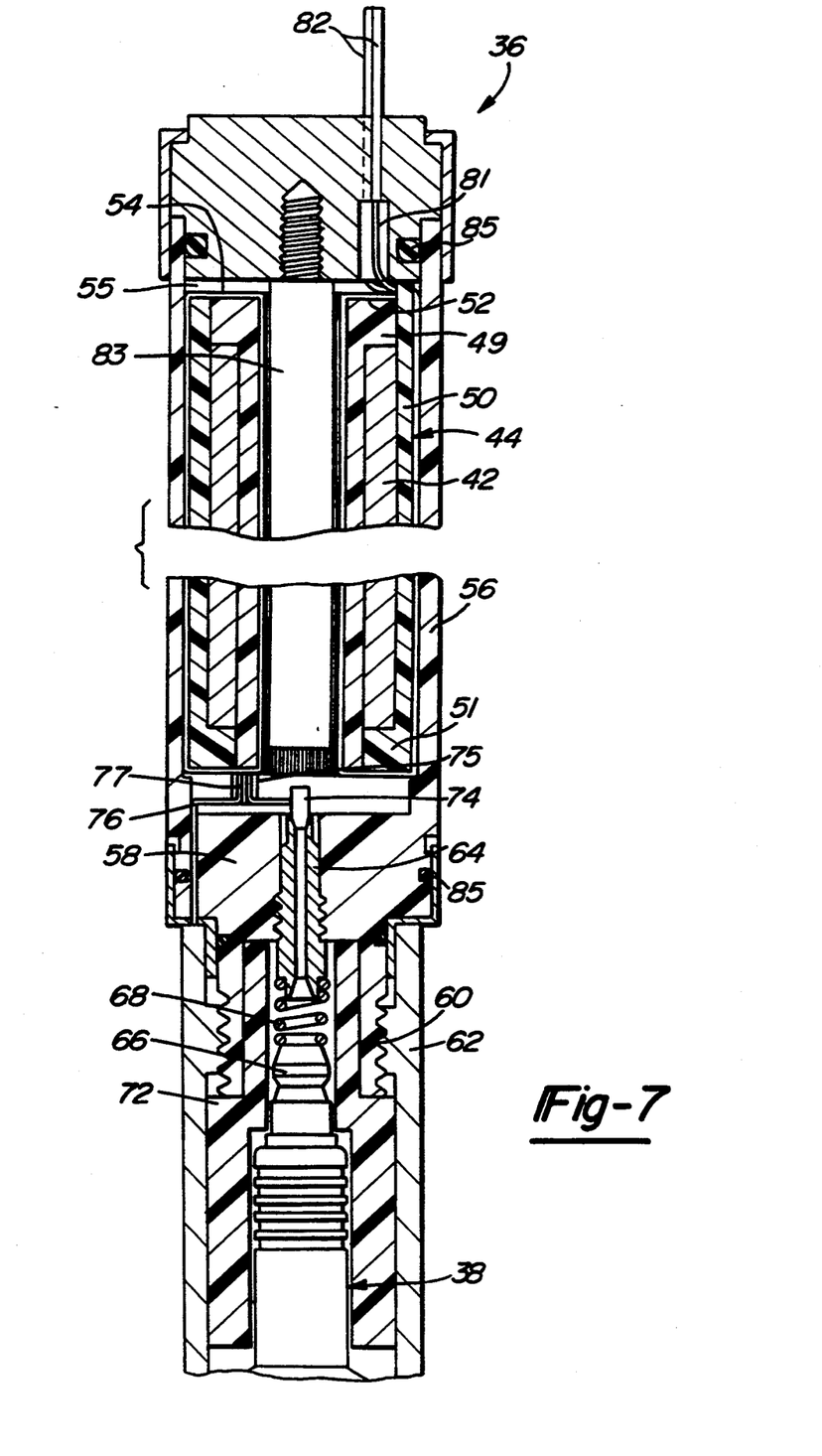
FIG. 7 is a longitudinal sectional view of a second ignition transformer incorporating the principles of the present invention.

As seen in FIG. 7, another embodiment of the transformer 36 of the present invention is illustrated therein with elements common to the previous embodiment being given like designations. In this second embodiment, the cavity of the transformer 36 is filled with a dielectric liquid and a central insulative post 83 is positioned to extend into substantially through the bore of the bobbin 44 from an end cap 84 which seals the dielectric liquid within the housing 56. To further ensure the integrity of the seal between the end cap 84 and the housing 56, an O-ring 85 can also be provided at the engagement of the housing 56 and the adaptor 62 for the same purposes. In substantially all other respects, the transformer 36 of the second embodiment is the same as that of the first.

As an illustrative example of the present invention, the following is presented for a preferred embodiment of the ignition transformer 36 when the diameter restriction on the transformer 36 is 24 mm. The transformer 36 includes a core 42 made of a material having the characteristics described above and which typically experiences a change in flux from about 14,000 to 500 Gauss. One such material, know as METGLAS, is produced by the Allied Signal Corporation and sold as Alloy 2605 TCA. The core 42 has an overall length of about 3.15 inches, an outer diameter of about 0.67 inches, an inner diameter of about 0.48 and includes a longitudinal air gap which is about 0.005 inches wide. The bobbin 44 is made from a material having a dielectric strength of about 680 volts/mil. One such material is a polyphenylene sulfide manufactured by the Hoechst Celanese Corporation and sold under the tradename FORTRON. The inner and outer sleeves 48 and 50 have a radial thicknesses of about 0.13 inches and 0.11 inches, respectively. Three turns of #24 wire are provided for the primary winding 52 and 210 turns of #40 wire are provided for the secondary winding 54. The dielectric liquid is transformer oil. The resulting transformer 36 exhibits an inductance of about 12.6 $\mu$H (microHenrys) and, when connected to the vehicle's 12$\nu$ power source, develops a maximum primary current of 50 A in about 100 $\mu$s and generates a secondary peak volt of about 25 k$\nu$ which decays to zero in about 100 $\mu$s.

Figure 8:
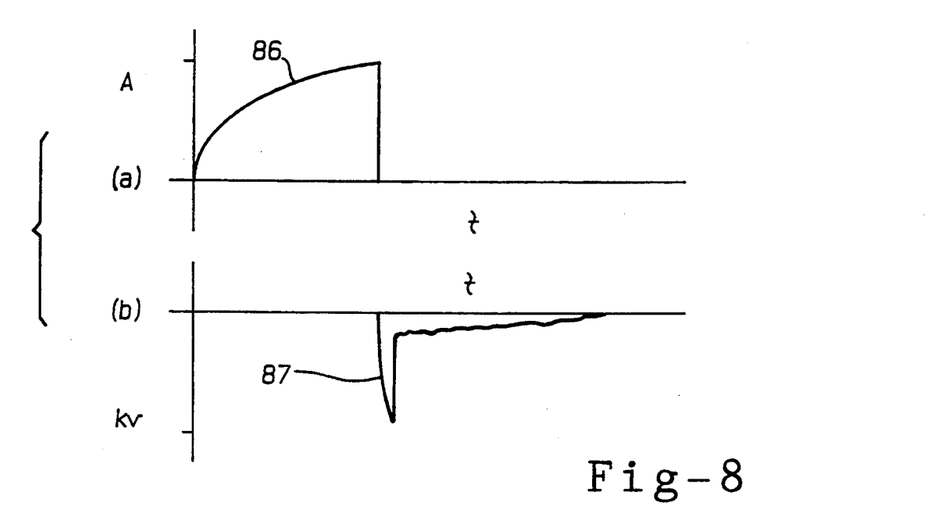
FIG. 8 is a graphical representation of the primary charging current and the secondary discharge voltage with respect to time.

In use, the primary 52 of the ignition transformer 36 is coupled to the ignition circuit 34. More particularly, the high side of the primary winding 52 is connected to a high speed, high current switching transistor 101 whose function is to switch the charging current on and off in response to a signal generated by the MPU 24 (an Intel 87C51FA 8-bit microcontroller in the preferred embodiment discussed above) as determined by its programmed algorithm. To fully charge the transformer 36, the primary winding 52 is connected through the coil driver and ignition circuit 34 across the vehicle's 12v power supply for approximately 100 μs. At the end of this time period, the current within the primary will have peaked at 50 A, a value at which the transformer core 42 will have become saturated. As seen in FIG. 8, upon the 50 A current 86 being abruptly shut-off by the high speed switching transistor 101, a voltage 87 will be induced in the transformer's secondary 54 which will peak in 2–4 μs at approximately 25 kv and decay to zero in about 100 μs. The low impedance of the ignition transformer 36 results in the voltage being efficiently transferred to the electrodes 82 of the spark plug 38. Also because of the transformer's low impedance, the time necessary to reach a breakdown voltage level that will cause an arc to form across the electrodes 82 is a fraction of a microsecond. Under normal engine operating conditions, the spark plug 38 will conduct in the range of 7–12 kv. If the primary current in the transformer 36 is limited by reducing the charging time, the maximum secondary voltage that is generated when the primary 52 is turned off will also be limited.

Figure 9:
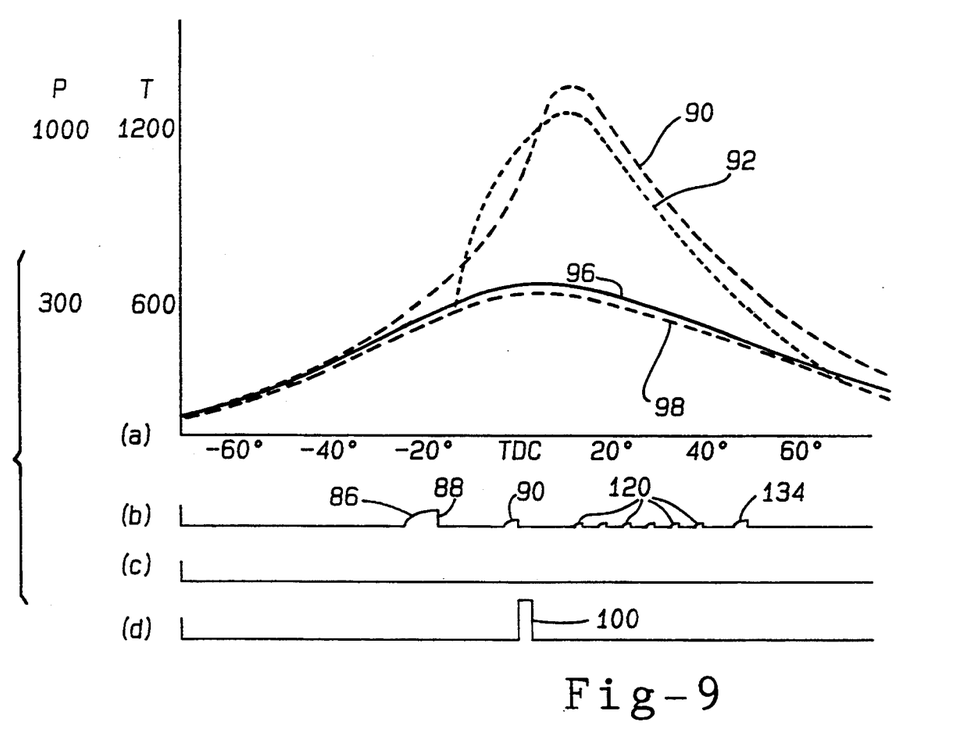
FIG. 9 is graphical illustration of the pressure and temperature at the spark plug during both a normal combustion event and a misfire event, as well as the applied voltages and reflected voltages occurring in the transformer during both events.

Referring now to FIG. 9, when conditions exist in the combustion chamber of the engine 28 that cause the spark plug 38 not to conduct the energy stored in the capacitance of the secondary 54, the system 20 of the present invention can be used to detect this misfiring of the cylinder. During normal combustion, the MPU 24 causes the coil driver circuit 34 to initiate an increasing coil charging current in the primary 52 of the transformer 36. Once the transformer 36 has been fully charged, the current is switched off, designated at 88, by the switching transistors 101 generating a maximum secondary voltage and beginning ignition within the combustion chamber. If normal combustion has been initiated, the pressure and temperature at the spark plug electrodes 80 will generally increase as designated by curves 90 and 92.

To determine whether combustion or misfire has occurred, the MPU 24 is programmed to cause the ignition transformer 36 to initiate a charging current 94 and develop a lower, predetermined applied voltage at the spark plug gap. This is timed so as to occur just before top dead center (BTDC). During normal combustion, the combination of pressure and temperature at the spark plug electrodes 80 will be sufficient to permit the lower applied voltage to conduct across the electrodes 80. As a result, the energy stored in the secondary capacitance will be discharged across the electrodes and will not be reflected back into the primary 54 of the transformer 36. (see FIG. 9(c)). During misfire, however, the pressure and temperature at the electrode 80 will not have sufficiently increased, as designated by curves 96 and 98, to enable the lower applied voltage 94 to conduct. As a result of this, the energy of the secondary capacitance will be reflected back into the primary 52 of the transformer 36 and appear as a negative voltage excursion 100 which can be detected on the high side of the switching transistor 101.

Figure 14:
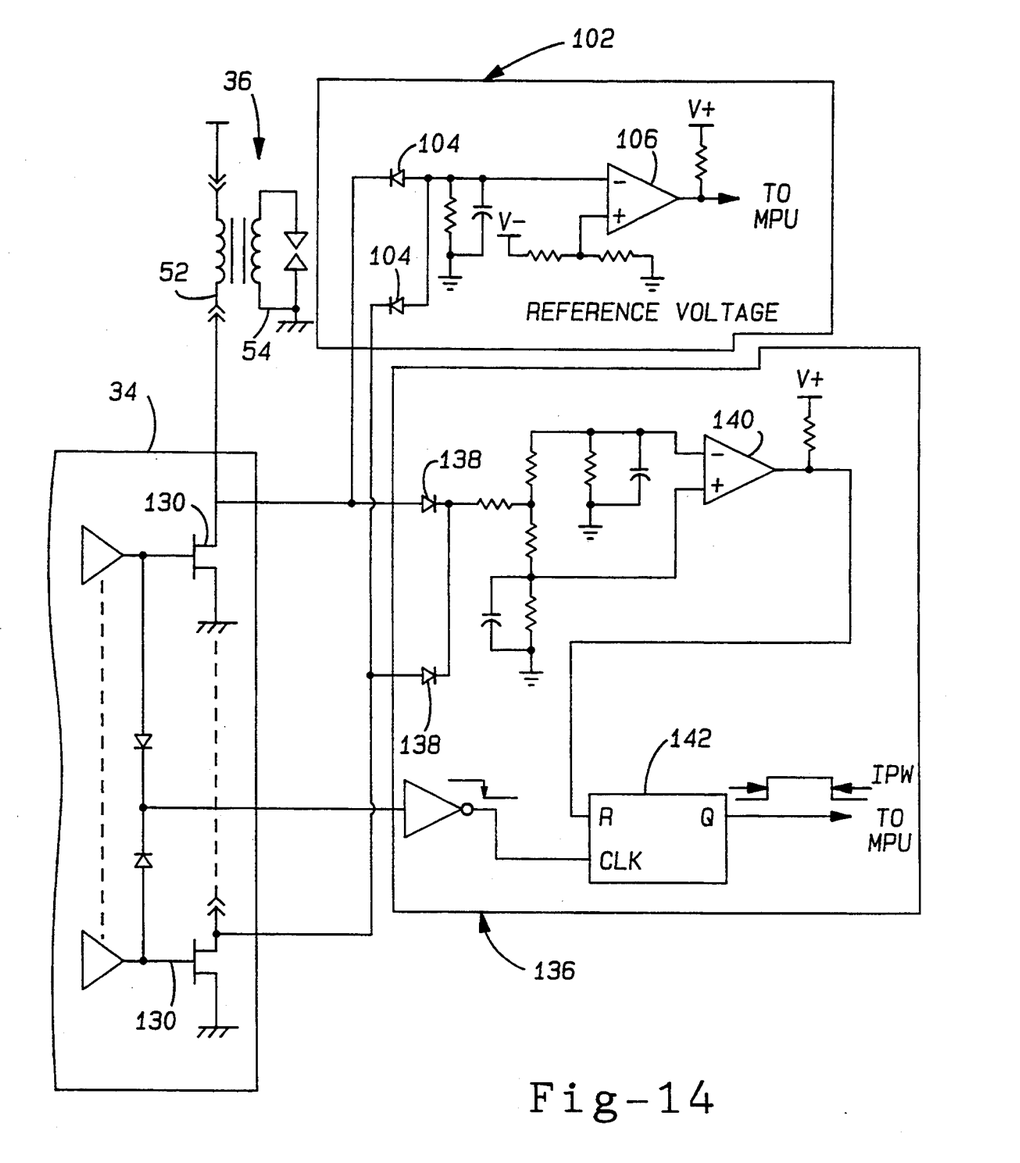
FIG. 14 is a schematic illustration of the coil driver circuits, ignition transformer and the detection circuits utilized in the present invention.

As seen in FIG. 14, the detection circuit 40 of the present invention includes a sub-circuit 102 for detecting negative voltage excursions 100. For each cylinder of the engine 28, the sub-circuit 102 incudes a diode 104 whose cathode is attached to the one high side of the switching transistor 101. In this manner, a single detection sub-circuit 102 can be used to monitor all of the engine's cylinders. For the sake of clarity, only two of the transistors 101 and diodes 104 are illustrated in FIG. 14. The diodes 104 feed any negative excursion through the sub-circuit 102 where the signal is conditioned and passed to a negative threshold reference comparator 106. The comparator 106 outputs a corresponding signal to the MPU 24 which processes the signal based on its programmed algorithm and, if necessary, shuts down a misfiring cylinder.

Figure 10:
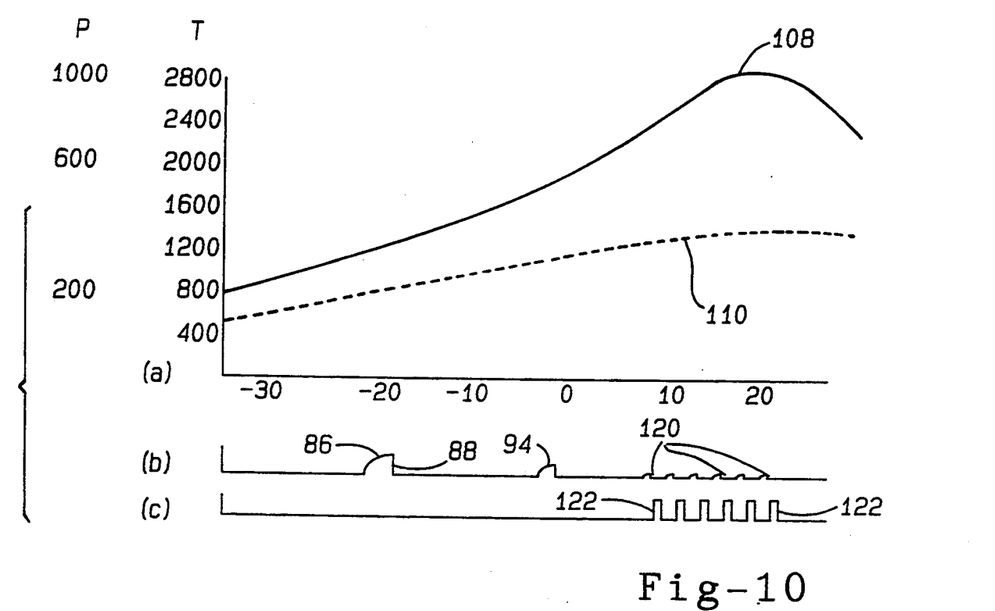
FIG. 10 graphically illustrates the pressure and temperature in the cylinder during a normal combustion event as well as the applied and reflected voltages in the ignition transformer during knock detection.
Figure 11:
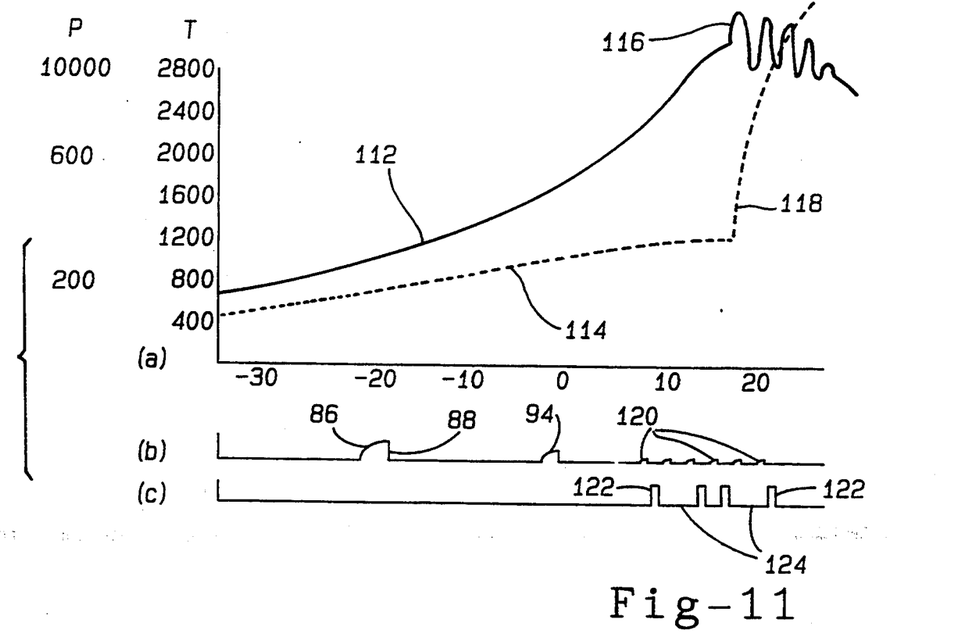
FIG. 11 is graphical illustration of the pressure and temperature in the cylinder during auto-ignition of the end gases as well as the applied and reflected voltages in the ignition transformer.

Detecting auto-ignition of the end gases (knock) uses the same basic approach as detecting misfire. Referring now to FIGS. 10 and 11, a normal combustion cycle and a knock combustion cycle are respectively illustrated therein. During normal combustion, the pressure within the cylinder 108, as indicated by curve 108, does not begin to significantly increase until ADTC. This is also true for the temperature within the cylinder, as indicated by curve 110. However, during a knock combustion cycle, pockets of exploding end gas cause pressure waves, which travel back and forth across the combustion chamber within the cylinder, along with a dramatic increase in the cylinder temperature. This typically begins to occur around 10° ATDC. The pressure and temperature curves of the knock combustion cycle are respectively indicated as curves 112 and 114 in FIG. 11, with the pressure fluctuations being designated at 116 and the temperature rise being designated at 118.

During the time period when knock is most likely to occur (typically around 10°–20° ATDC), the MPU 24 duty cycles the coil driver circuit 34 and current 120 going to the transformer 36 so as to produce a series of applied voltages. Because of the combination of pressure 108 and temperature 110 during normal combustion, the level of the applied voltage 120 is chosen so that the spark plug 38 will not subsequently conduct during normal combustion. As a result, a negative voltage excursion 122 is reflected back into the primary 52. As seen in FIG. 10(c), a negative voltage excursion 122 will be present for each applied voltage 120 during a normal combustion cycle. The sub-circuit 102 feeds this information as an input to the MPU 24 where it is processed and passed on to the engine controller 22, which utilizes this information to advance the spark timing toward the threshold of auto-ignition.

In a "knock" combustion cycle (FIG. 11), the applied voltages 120 are again generated when the combination of pressure fluctuations 116 and dramatic temperature increase 118 are expected to occur. By applying a series of voltages 120 over this time frame, the chances that at least one of the applied voltages 120 will correspond with a decreased pressure fluctuation and allow the applied voltage 120 to discharge in an arc across the spark plug gap is increased. As a result, a corresponding negative voltage excursion 122 will be absent. If one or more of the reflected voltages 122 are missing, designated at 124, in response to a correspondingly applied voltage 120, the MPU 24 will sense this through the detection sub-circuit 102 and send the appropriate signals to the engine controller 22 so that the spark timing can be correspondingly stepped toward eliminating knock. By alternately advancing and retarding the timing of the engine as described above, the engine controller 22 is capable of maintaining the spark timing at the threshold of auto-ignition.

The ignition transformer 36 of the present invention can also be used to exploit the value of the breakdown voltage to determine engine load. To reliably determine the breakdown voltage level, the relationship between the charging energy (the energy required to charge the distributed capacitance of the secondary 54 up to the breakdown voltage level) and the distributed energy (the energy dissipated by the spark plug arc current) is used. This relationship is represented by the equation:

$$\xi_{Ts} = \tfrac{1}{2} {}^* C V_{BD}^2 + \tfrac{1}{2} {}^* E I_p {}^* t$$

where $V_{BD}$ is the breakdown voltage at the spark plug; C is the distributive capacitance of the secondary circuit; E is the arc current voltage at the electrodes; $I_p$ is the peak arc current at the spark plug electrodes 80; t is the arc current discharge time which varies inversely with the breakdown voltage; and $\xi_{Ts}$ is the total energy available to the secondary circuit. By solving the above equation for the breakdown voltage, the breakdown voltage can be expressed as a function of time with the remaining parameters all being known values dependent on the specific design of the transformer 36.

Figure 12:
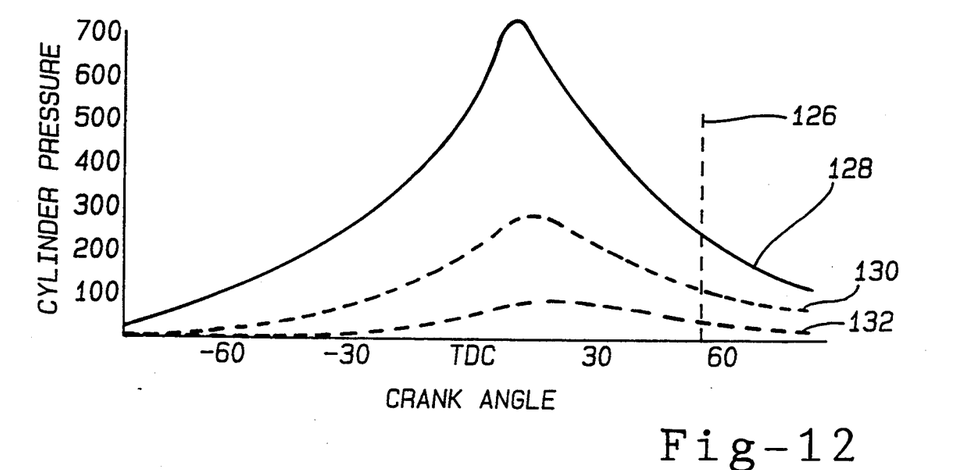
FIG. 12 is a graphical illustration of the cylinder pressure relative to crank angle position for various engine loads.

Referring now to FIG. 12, during the monitoring of engine load, the spark plug breakdown voltage is determined at an "interrogate" time or crank angle position 126 where the effect of other variables, such as the temperature, the air/fuel ratio and the spark advance, are no longer an influence on the cylinder pressure. This is most likely to occur within the range of about 20°–50° ATDC, depending on the particular engine. The value of the breakdown voltage at the interrogate crank angle position 126 is therefore directly proportional to the cylinder pressure, which in turn is indicative of the engine load. Three pressure curves, which relate to a heavy load 128, a light load 130 and an idle load 132, are shown in FIG. 12.

At the "interrogate" crank angle position 126, the coil driver circuit 34 initiates a current 134 (in FIG. 9) that charges the primary 52. Specific to the engine load or pressure then present within the cylinder, the energy stored in the secondary 54 will begin discharging at a specific breakdown voltage across the spark plug gap and will continue discharging for a corresponding time period.

Figure 13:
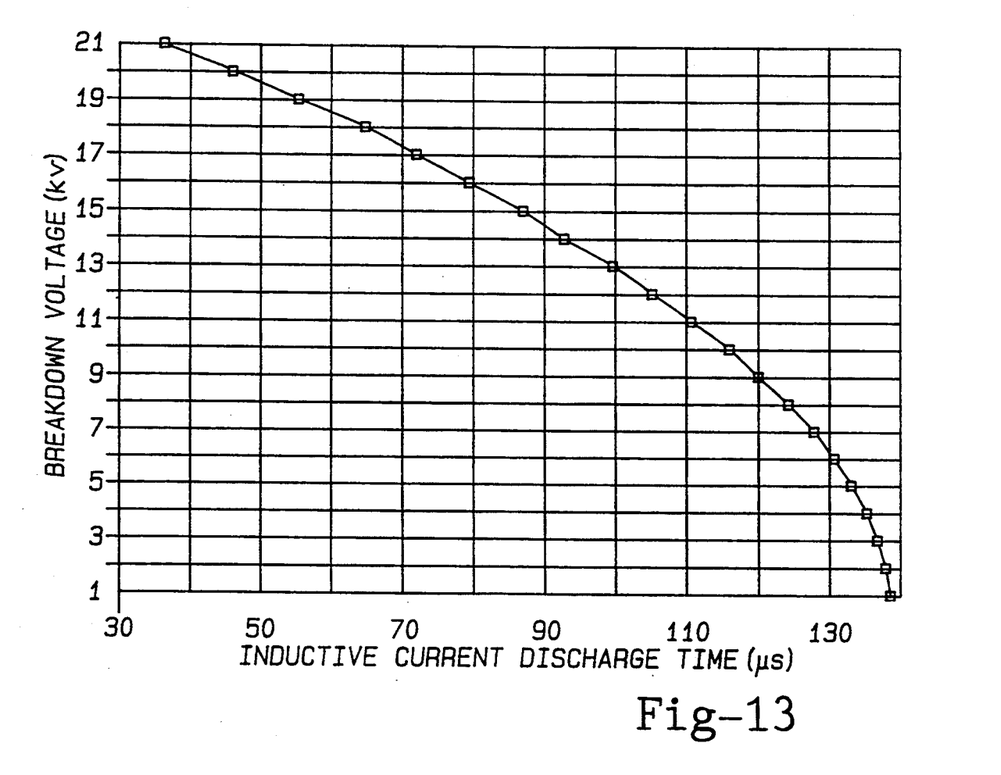
FIG. 13 is a graphical illustration of the breakdown voltage relative to the inductive current discharge time.

While direct measurement of the breakdown voltage is problematic, measuring the duration of the inductive current discharge, and relating this time to the breakdown voltage (see FIG. 13), is more easily performed. This is accomplished by a load or second detection sub-circuit 136 of the detection circuit 40. Again, a single sub-circuit 136 is used to monitor all of the engine cylinders.

Once the spark plug 38 has started to conduct the secondary current, a second set of diodes 138, whose anodes are attached to the high side of the switching transistor 101, detect the positive voltage associated with the secondary current flow and feed the associated voltage into the load detecting sub-circuit 138 of the detection circuit 40. As long as the arc current is flowing, the voltage at the high side of the switching transistor 101 will be significantly above the 12vdc power supply of the vehicle. The load detection sub-circuit 136 outputs a pulse to the MPU 24 having a length which corresponds to the duration of this elevated voltage and the length of time over which the inductive current discharges. The MPU 24 correlates the inductive pulse width into the breakdown voltage which, using Paschen's Law, can be correlated to the pressure in the cylinder and engine load. The MPU 24 then outputs this information to the engine controller 22 so that the spark timing, air/fuel ratio and other ignition and engine control parameters can be appropriately modified.

More specifically, the inductive pulse width measurement is started at the end of the ignition dwell and is done by monitoring the reflection which occurs in the primary 52 during the secondary discharge. The reflected signal in the primary 52 and an auto-tracking reference signal, which compensates for variations in the power supply voltage, are biased and filtered at appropriate levels to provide an accurate measurement of the inductive phase. These signals are then fed to a comparator 140 which detects the inductive current reducing to zero or near zero. Once the inductive current has decayed, a signal from the comparator 140 is fed to a flip-flop 142 which has also received an input indicating the end of the ignition dwell. This enables the flip-flop 142 to output a signal representing the indicting pulse width to the MPU 24. The MPU 24 then correlates the inductive pulse width to breakdown voltage allowing the cylinder pressure and engine load to be determined.

While the above description constitutes the preferred embodiments of the present invention, it will be appreciated that the invention is susceptible to modification, variation and change without departing from the proper scope and fair meaning of the accompanying claims.

We claim:

1. An ignition and engine control system for an internal combustion engine having a spark plug and a piston located within a combustion chamber, said ignition and engine control system comprising:

an ignition transformer adapted for mounting on the spark plug and being capable of firing the spark plug a multiple number of times during a combustion cycle, said transformer having a core, a primary winding and a secondary winding both located about said core, said secondary winding being electrically connected to the spark plug;

circuit means for supplying a charging current to said primary winding of said ignition transformer, said charging current inducing a voltage potential in said secondary winding and being applied to the spark plug;

control means for providing control signals to said circuit means causing said charging current to be initiated in said primary winding at predetermined times during said combustion cycle inducing said voltage potential in said secondary winding and being applied to the spark plug, said control means adapted to cause initiation of combustion within said engine by inducing an ignition charging current and ignition voltage potential which is applied by said circuit means to the spark plug at a first predetermined position of the piston, said control means also adapted to perform at least one diagnostic function by inducing a diagnostic charging current and diagnostic voltage potential which is applied to the spark plug by said circuit means at a second predetermined position of the piston during the same combustion cycle but after said first predetermined position, said diagnostic charging current;

timing means for sensing the position of the piston in the combustion chamber and for providing a timing signal corresponding thereto to said control means; and detection means for detecting the occurrence of an inductive current discharge across the spark plug as a result of said diagnostic voltage potential in said secondary winding being applied to the spark plug and conditions then present within said combustion chamber, said detection means being coupled to said primary winding of said transformer and to said control means and thereby enabling said control means to determine if said electrical discharge occurred and to further determine if a predetermined condition exists in the combustion chamber thereby allowing said control means to take appropriate measures in response to the occurrence or non-occurrence of said predetermined condition.

2. An ignition and engine control system as set forth in claim 1 wherein said transformer is a flyback transformer.

3. An ignition and engine control system as set forth in claim 1 wherein said transformer is a toroidal flyback transformer.

4. An ignition and engine control system as set forth in claim 1 wherein said detection means is an electrical circuit coupled to said transformer.

5. An ignition and engine control system as set forth in claim 1 wherein said detection means includes a circuit adapted to detect an absence of an inductive current discharge providing a means for indicating a misfire condition within said combustion chamber.

6. An ignition and engine control system as set forth in claim 1 wherein said detection means includes a circuit adapted to detect the occurrence of an inductive current discharge providing a means for indicating auto-ignition of the end gases within said combustion chamber.

7. An ignition and engine control system as set forth in claim 1 wherein said detection means includes a circuit adapted to enable monitoring of engine load.

8. An ignition and engine control system as set forth in claim 1 wherein said detection means includes a circuit adapted to output a pulse width to said control means corresponding to the duration of said inductive current discharge, said pulse width enabling said control means to determine engine load.

9. An ignition and engine control system as set forth in claim 1 wherein said circuit means includes a high speed switching transistor coupled to said transformer.

10. An ignition and engine control system as set forth in claim 8 wherein said detection means is a detection circuit is coupled to said switching transistor.

11. An ignition and engine control system as set forth in claim 9 wherein said detection circuit outputs a pulse width corresponding to the time over which the high side of said switching transistor is above 12 vdc thereby indicating the duration of said inductive current discharge.

12. An ignition and engine control system as set forth in claim 1 wherein said control means causes a charging current to induce a predetermined voltage potential in said transformer during a portion of the combustion cycle to determine if a misfire condition exists in the combustion chamber.

13. An ignition and engine control system as set forth in claim 12 wherein said portion of said combustion cycle is before-top-dead-center.

14. An ignition and engine control system as set forth in claim 1 wherein said control means causes a series of charging currents to induce a series of predetermined voltage potentials in said transformer during a portion of the combustion cycle where auto-ignition of the end gases is likely to occur.

15. An ignition and engine control system as set forth in claim 14 wherein said portion of said combustion cycle is within the range of 5 to 25 degrees after-top-dead-center.

16. An ignition and engine control system as set forth in claim 1 wherein said control means causes a charging current to induce a predetermined voltage potential in said transformer during a portion of the combustion cycle where the pressure in the combustion chamber is proportional to the engine load.

17. An ignition and engine control system as set forth in claim 16 wherein said portion of the combustion cycle is in the range of about 20 to 50 degrees after-top-dead-center.

18. An ignition and engine control system as set forth in claim 1 wherein said detection means is a circuit capable of detecting a negative voltage reflection in said primary winding as a result of non-occurrence of an inductive current discharge.

19. An ignition and engine control system as set forth in claim 1 wherein said control means is adapted to cause a charging current to induce a maximum voltage potential in said transformer during a portion of the combustion cycle so as to initiate combustion, said control means being programmable and programmed to cause second charging current to induce a predetermined voltage potential in said transformer during a portion of the same combustion cycle to determine if a misfire condition exists in the combustion chamber, said control means also being programmed to cause a series of charging currents to induce a series of predetermined voltage potentials in said transformer during a portion of the same combustion cycle where auto-ignition of the end gases is likely to occur, and said control means being further programmed to cause a charging current to induce a predetermined voltage potential in said transformer during a portion of the same combustion cycle where the pressure in the combustion chamber is proportional to the engine load.

20. An ignition and engine control system as set forth in claim 1 wherein said ignition transformer charges directly off of a 12 vdc power supply.

21. An ignition and engine control system for an internal combustion engine having a piston located within a combustion cylinder, said ignition and engine control system comprising:

a spark plug, said spark plug having electrodes positioned within the combustion cylinder;

an ignition transformer mounted on said spark plug, said transformer having a core, a primary winding and a secondary winding both located about said core, said secondary winding being electrically connected to said spark plug, said transformer adapted to produce an arc across said spark plug electrodes a multiple number of predetermined times during a given combustion cycle and being operable directly off of a 12 vdc power supply;

a coil driver circuit adapted to supply an ignition charging current to said primary winding of said ignition transformer at a first predetermined time during said combustion cycle, said ignition charging current inducing an ignition voltage potential in said secondary winding which is applied to said electrodes of said spark plug to cause ignition of the engine, said coil driver circuit also being adapted to supply a diagnostic charging current to said primary winding of said ignition transformer at a second predetermined time during said combustion cycle, said second predetermined time being after said first predetermined time, said diagnostic charging current inducing a diagnostic voltage potential in said secondary winding which is applied to said electrodes of said spark plug to induce a diagnostic discharge across said electrodes of said spark plug;

a controller including a programmable microprocessing unit, said controller providing control signals to said coil driver circuit thereby causing said multiple charging current to be initiated in said primary winding during a given combustion cycle;

timing means for sensing the position of the piston in the combustion cylinder, said timing means providing timing signals to said controller corresponding to the position of the piston and said controller utilizing said timing signals to provide said control signals said predetermined times during the combustion cycle; and a first detection circuit coupled to said primary winding of said transformer and being capable of detecting the occurrence of diagnostic electrical discharge across said electrodes of said spark plug as a result of said diagnostic voltage potential in said secondary windings being applied to said spark plug and conductive conditions existing in said combustion cylinder, said first detection circuit outputting a signal to said controller in response to a failure of said electrical discharge to occur and existence of a predetermined condition within the combustion cylinder, said signal thereby allowing said controller to respond to the occurrence of said predetermined condition; and a second detection circuit capable of measuring the duration of said diagnostic electrical discharge across said electrodes of said spark plug as a result of said diagnostic voltage potential in said secondary windings being applied to said spark plugs, said second detection circuit outputting a signal corresponding to said duration of said diagnostic electrical discharge, said signal enabling said controller to determine an existing condition within said combustion chamber and respond thereto.

22. An ignition and engine control system as set forth in claim 21 wherein said first detection circuit is electrically connected to said primary winding of said transformer.

23. An ignition and engine control system as set forth in claim 22 wherein said first detection circuit detects a negative voltage excursion in said primary winding indicating the non-occurrence of said electrical discharge.

24. An ignition and engine control system as set forth in claim 21 wherein said second detection circuit is electrically connected to said primary winding of said transformer.

25. An ignition and engine control system as set forth in claim 24 wherein said second detection circuit outputs a signal corresponding to the duration of an inductive current discharge across said spark plug electrodes.

26. An ignition and engine control system as set forth in claim 21 further comprising a plurality of spark plugs and a plurality of ignition transformers, said first detection circuit being coupled to all of said spark plugs and all of said ignition transformers, said detection circuit and said controller cooperating to detect the occurrence of an individual electrical discharge across each of said spark plugs.

27. An ignition and engine control system as set forth in claim 21 further comprising a plurality of spark plugs and a plurality of ignition transformers, said second detection circuit being coupled to all of said spark plugs and all of said ignition transformers, said detection circuit and said controller individually detecting the occurrence of an electrical discharge across each of said spark plugs.

* * * * *